501-98

9/16/85 XR 4,612,297

United States Patent [19]

Kasai et al.

[11] Patent Number: 4,612,297

[45] Date of Patent: Sep. 16, 1986

[54] PROCESS FOR PREPARATION OF SILICON NITRIDE POWDER OF GOOD SINTERING PROPERTY

[75] Inventors: Kiyoshi Kasai; Takaaki Tsukidate, both of Shinnanyo; Shinji Nagata, Ibaraki; Toshihiko Arakawa, Shinnanyo, all of Japan

[73] Assignee: Toya Soda Manufacturing Co., Ltd., Shinnanyo, Japan

[21] Appl. No.: 558,884

[22] Filed: Dec. 7, 1983

[30] Foreign Application Priority Data

Dec. 8, 1982 [JP] Japan ............................. 57-213995

[51] Int. Cl.[4] ............................................ C04B 35/58

[52] U.S. Cl. ...................................... 501/97; 264/65; 423/344; 501/98; 501/152

[58] Field of Search ......................... 501/97, 98, 152; 423/344; 264/65

[56] References Cited

U.S. PATENT DOCUMENTS

| | | | |
|---|---|---|---|
| 3,959,446 | 5/1976 | Mazdiyasni et al. | 423/344 |
| 4,073,845 | 2/1978 | Buljan et al. | 501/97 |
| 4,113,830 | 9/1978 | Mazdiyasni et al. | 501/97 |
| 4,208,215 | 6/1980 | Kleiner et al. | 423/344 |
| 4,264,547 | 4/1981 | de Pous | 501/97 |
| 4,346,068 | 8/1982 | Kasai et al. | 423/406 |
| 4,376,652 | 5/1983 | Buljan | 501/97 |
| 4,387,079 | 6/1983 | Kasai et al. | 423/344 |
| 4,410,636 | 10/1983 | Minjolle et al. | 501/152 |
| 4,487,840 | 12/1984 | Raj et al. | 501/97 |
| 4,492,665 | 1/1985 | Pompe | 501/97 |
| 4,511,525 | 4/1985 | Tsuge et al. | 264/65 |
| 4,517,168 | 5/1985 | Kawahito et al. | 501/97 |

FOREIGN PATENT DOCUMENTS

| | | | |
|---|---|---|---|
| 53-118409 | 10/1978 | Japan | 501/98 |
| 58-176109 | 10/1983 | Japan | 423/344 |

OTHER PUBLICATIONS

Chem. Abstracts, 103 (1985) item 165151h, "Preparation of Silicon Nitride Powder with Good Sinterability".

*Primary Examiner*—Helen M. McCarthy
*Attorney, Agent, or Firm*—Cushman, Darby & Cushman

[57] ABSTRACT

A silicon nitride powder having an enhanced sintering activity is prepared by heating a mixture of a nitrogen-containing silane compound and a sintering aid in a non-oxidizing atmosphere.

5 Claims, No Drawings

PROCESS FOR PREPARATION OF SILICON NITRIDE POWDER OF GOOD SINTERING PROPERTY

BACKGROUND OF THE INVENTION (1) Field of the Invention

This invention relates to a process for the preparation of a silicon nitride powder excellent in the sintering activity.

(2) Description of the Prior Art

As is well-known, silicon nitride ($Si_3N_4$) is advantageous over conventional ceramic products in the following points: (1) the mechanical strengths and hardness are very high, and the strengths at high temperatures is high, (2) the thermal shock resistance is high and the fire resistance is high, (3) the chemical stability is good and the corrosion resistance is high, and (4) the electrically insulating property is good. Accordingly, sintered silicon nitride are broadly used in various fields, for example, as high-grade refractory materials for metal smelting, ceramic industry and machine industry, other refractory materials, wear resistant materials and electrically insulating materials.

Recently, silicon nitride has attracted attentions in the art as staring materials for high temperature articles for which high strengths, high heat resistance and high mechanical shock resistance are required, such as gas turbines.

Since silicon nitride is inherently difficult to sinter, various attempts have heretofore been made to improve the sintering property of silicon nitride, but no satisfactory method for improving the sintering property of silicon nitride has been developed. According to the conventional techniques, if the sintering activity is improved, the high temperature strengths are reduced, and it is difficult to obtain a sintered product which is satisfactory in both the sintering activity and the high temperature strengths. For example, if silicon nitride powders prepared according to various conventional processes are sintered under ordinary conditions by pressureless sintering, shrinkage due to sintering is hardly caused, and therefore, the density and strengths of the obtained sintered products are very low and they cannot be used for the intended objects at all. Highly dense materials may be obtained from materials which are difficult to sinter, such as silicon nitride and SiC, by hot pressing under a super high pressure without using a sintering aid as in case of the synthesis of diamond. However, since this process is carried out under a super high pressure, the sintering cost is expensive and, from the economical and industrial viewpoints, the process cannot be adopted. Accordingly, 10 to 20% by weight of an oxide such as MgO, $Al_2O_3$, $Y_2O_3$ or $ZrO_2$ has been added as a sintering aid to a silicon nitride powder. A sintered material of silicon nitride obtained by adding such a sintering aid is characterized in that a low-melting-point phase is formed in the crystal grain boundary of silicon nitride and hence, sintering is promoted and the density is increased. However, formation of this low-melting-point phase results in reduction of the high temperature strengths. Therefore, it is difficult to obtain a sintered product which is satisfactory in both the high density and the high temperature strength.

SUMMARY OF THE INVENTION

The primary object of the present invention is to provide a silicon nitride powder capable of being formed into a sintered material having a high density and good high temperature strengths by economical and conventional sintering methods.

More specifically, in accordance with the present invention, there is provided a process for the preparation of a silicon nitride powder excellent in the sintering property, which comprises firing a mixture of a nitrogen-containing silane compound and a sintering aid in a non-oxidizing atmosphere.

DESCRIPTION OF THE PREFERRED EMBODIMENTS

As the nitrogen-containing silane compound used in the present invention, there can be mentioned silicon diimide $Si(NH)_2$ obtained by reaction of a silicon halide with ammonia, silicon diimide obtained by washing a mixture of ammonium halides with liquid ammonia, followed by isolation, a decomposition compound $Si_2N_3H$ obtained by heating a mixture of $Si(NH)_2$ and an ammonium halide in a non-oxidizing atmosphere at a temperature of, for example, 400° to 1,300° C. These starting materials to be subjected to the subsequent thermal decomposition do not substantially contain a halogen. As the sintering aid used in the present invention, there can be mentioned oxides such as $Y_2O_3$, $Al_2O_3$ and MgO, and non-oxides that can be converted to oxides under heating, such as carbonates, oxalates, AlN and TiN.

In the present invention, mixing of the nitrogen-containing silane compound with the sintering aid can be effected by uniformly blending the two compounds by using a ball mill, a blender or a mixer. It is especially preferred that a mixing device having both the pulverizing and dispersing functions, such as a stirring crusher, an attritor or a wet ball mill, be used. The mixture may be used in the as-prepared form or after granulation and molding.

A silicon nitride power excellent in the sintering activity can also be obtained by heating in a non-oxidizing atmosphere a reaction product of a silicon halide containing a sintering aid component dissolved therein with ammonia. By the term "sintering aid component" used herein is meant a component that can be converted to a so-called sintering aid, for example, an oxide such as $Y_2O_3$, $Al_2O_3$ or MgO or a non-oxide such as AlN or TiN, at the step of synthesizing a silicon nitride powder. For example, there can be mentioned a solution of $TiCl_4$ or an alcoholate and a solid compound such as $AlCl_3$ or $YCl_3$. The former solution as it is or the latter compound dissolved in a solvent such as carbon tetrachloride is homogeneously dissolved in a silicon halide. In this embodiment, after formation of the nitrogen-containing silane compound, the solvent should be removed in an inert atmosphere such as a nitrogen gas atmosphere or in vacuum. The content of the sintering aid component is adjusted so that the amount of the sintering aid is 0.5 to 20% by weight at the step of obtaining a sintered product.

In the present invention, the mixing ratio of the sintering aid is 0.5 to 20% by weight, preferably up to 17% by weight, more preferably 2 to 8% by weight, especially preferably 3 to 5% by weight.

In the present invention, heating is conducted at a temperature of 1,200° to 1,700° C. in a non-oxidizing atmosphere. The heating temperature is determined according to the kind of the atmosphere adopted for heating. More specifically, in an atmosphere composed mainly of nitrogen, the heating temperature is 1,400° to 1,700° C., and in vacuum or in an atmosphere composed mainly of at least one member selected from hydrogen and argon, the heating temperature is 1,200° to 1,350° C. If heating is carried out at a temperature lower than 1,400° C. in an atmosphere composed mainly of nitrogen, the thermal decomposition of the nitrogen-containing silane compound is insufficient and amorphous silicon nitride is formed. If heating is carried out at a temperature higher than 1,700° C. in the nitrogen atmosphere, grain growth of silicon nitride is undesirably caused. If heating is carried out at a temperature lower than 1,200° C. in vacuum or in a hydrogen and/or argon atmosphere, amorphous silicon nitride is similarly formed, and if the heating temperature is higher than 1,350° C., decomposition to metallic silicon is undesirably caused.

When the silicon nitride powder obtained by heating a mixture of the nitrogen-containing silane compound and the sintering aid is sintered, as described hereinafter, even if the amount of the sintering aid added is small, a sintered product having a high density can be obtained. Although the reason has not been completely elucidated, it is believed that (1) since the specific surface area of the nitrogen-containing silane compound is as large as 100 to 1,000 $m^2/g$, it reacts promptly with the sintering aid added and a homogeneous product is obtained and (2) since the silicon nitride powder is a product of the reaction with the sintering aid, decomposition to metallic silicon is controlled at the sintering step.

The sintered material obtained by sintering the silicon nitride powder prepared by heating a mixture of the nitrogen-containing silane compound and the sintering aid under specific conditions is excellent in the sintering activity and also in the high temperature property, as shown in Table 1 given hereinafter.

The feature of the present invention resides in that when a sintered silicon nitride is prepared by using the silicon nitride powder obtained according to the present invention as the starting material, even if the amount of the sintering aid added is small, an excellent sintered material can be obtained. This is quite a surprising fact. Silicon nitride obtained according to the present invention is especially suitable as the starting material for the production of engine parts for which high strengths and high reliability are required.

Incidentally, when silicon nitride powders obtained in Comparative Examples given hereinafter are mixed with a sintering aid and the mixtures are subjected to sintering, densification is difficult and sintered bodies having a high density cannot be obtained.

Furthermore, a sintered material obtained by sintering a silicon nitride powder obtained by heating a reaction product of a silicon halide containing a sintering aid dissolved therein with ammonia is excellent in the sintering activity and the strengths of the sintered product at normal and high temperatures.

The present invention will now be described in detail with reference to the following examples that by no means limit the scope of the invention.

EXAMPLES 1 THROUGH 4 AND COMPARATIVE EXAMPLES 1 THROUGH 4

A saturated silicon tetrachloride vapor (25° C.) carried by a nitrogen gas was fed at a rate of 33 g/hr into an outer tube of a charging double tube and an ammonia gas was fed into an inner tube of the charging tube at a rate of 20 g/hr, and they were introduced into a reaction tube (60 mm in diameter and 280 mm in length) maintained at 10° C. by circulating cold water where they were continuously reacted with each other. The formed fine powder was carried by the nitrogen gas and collected in a vessel disposed below the reaction tube. The powder was packed in a tubular furnace of quartz having a diameter of 140 mm and the temperature was elevated at a rate of 20° C./hr in an ammonia atmosphere, and the powder was maintained at 1,000° C. for 2 hours to obtain a white amorphous powder. From the results of the chemical analysis, it was found that the composition of the formed powder was very close to $Si_2N_3H$.

The powder was mixed with a sintering aid shown in Table 1 for 4 hours in a ball mill made of polyethylene, and the powdery mixture was press-molded in a molding press having a diameter of 25 mm under a molding pressure of 200 kg $cm^2$ and heated at 1,550° C. for 0.5 hour in a nitrogen atmosphere. Thus, four powders shown in Table 1 were prepared. Each powder was pulverized in a ball mill made of polyethylene, press-molded in a size of 5 mm×50 mm×4 mm in a molding press and sintered in a nitrogen atmosphere maintained at 1,650° to 1,750° C. for 1 hour to obtain a sintered material. The surface of the sintered product was ground by a diamond wheel 400, and the density and flexural strength were measured. The obtained results are shown in Table 1.

For comparison, the sintering aid was merely added to a silicon nitride powder and a sintered product was obtained from the mixture in the same manner as described above. The measured values of the obtained comparative sintered products are shown in Table 1.

Incidentally, the flexural strength was determined by the three-point bending test where the span length was adjusted to 30 mm, and with respect to each sintered material, 10 specimens were tested and the average value was calculated.

TABLE 1

| | | | Flexural Strength ($kg/mm^2$) | |
|---|---|---|---|---|
| | Sintering Aid (% by weight) | Density ($g/cm^3$) | Room temperature | High temperature (1,200° C.) |
| Example 1 | $Al_2O_3$ (12%), AlN (5%) | 3.14 | 72 | 60 |
| Example 2 | MgO (3%) | 3.14 | 70 | 53 |
| Example 3 | $Y_2O_3$ (3%), $Al_2O_3$ (1%) | 3.13 | 79 | 55 |
| Example 4 | MgO (0.8%), $Al_2O_3$ (2.2%) | 3.05 | 65 | 49 |
| Comparative Example 1 | $Al_2O_3$ (12%), AlN (5%) | 2.92 | 44 | 28 |
| Comparative Example 2 | MgO (3%) | 2.80 | 39 | 15 |
| Comparative Example 3 | $Y_2O_3$ (3%), $Al_2O_3$ (1%) | 2.83 | 41 | 20 |
| Comparative Example 4 | MgO (0.8%), $Al_2O_3$ (2.2%) | 2.60 | 30 | 18 |

EXAMPLES 5 THROUGH 8

A powdery mixture of $Si(NH)_2$ and $NH_4Cl$ obtained in the same manner as described in Examples 1 through 4 was washed with liquid ammonia maintained at −70° C. to remove $NH_4Cl$ formed as the by-product and isolate $Si(NH)_2$. This powder of $Si(NH)_2$ was mixed with a sintering aid shown in Table 2 in the same manner as in Examples 1 through 4, and the mixture was maintained in a hydrogen atmosphere at 1,300° C., for 1 hour. Thus, four kinds of powders were obtained. The powders were sintered in the same manner as in Example 1, and the density and flexural strength were measured. The obtained results are shown in Table 2.

TABLE 2

| Example No. | Sintering Aid (% by weight) | Density ($g/cm^3$) | Flexural Strength ($kg/mm^2$) Room temperature | Flexural Strength ($kg/mm^2$) High temperature (1,200° C.) |
|---|---|---|---|---|
| 5 | $Al_2O_3$ (12%), AlN (5%) | 3.12 | 70 | 58 |
| 6 | MgO (3%) | 3.14 | 72 | 55 |
| 7 | $Y_2O_3$ (3%), $Al_2O_3$ (1%) | 3.12 | 75 | 53 |
| 8 | MgO (0.8%), $Al_2O_3$ (2.2%) | 3.07 | 71 | 50 |

EXAMPLES 9 THROUGH 12

A silicon tetrachloride vapor (25° C.) carried by a nitrogen gas and an ammonia gas were introduced into a quartz tube (50 mm in diameter and 1,000 mm in length) maintained at 1,000° C. at rates of 33 g/hr and 20 g/hr, respectively, where they were continuously reacted with each other. The formed fine powder was carried by the nitrogen gas and collected in a vessel maintained at 500° C.

The powder was blended with a sintering aid shown in Table 3 for 2 hours by a V-blender, and the resulting powdery mixture was maintained at 1,300° C. in vacuum for 1 hour. Thus, four kinds of powders were obtained. The powders were sintered in the same manner as described in Example 1, and the density and flexural strength were measured. The obtained results are shown in Table 3.

TABLE 3

| Example No. | Sintering Aid (% by weight) | Density ($g/cm^3$) | Flexural Strength ($kg/mm^2$) Room temperature | Flexural Strength ($kg/mm^2$) High temperature (1,200° C.) |
|---|---|---|---|---|
| 9 | $Al_2O_3$ (12%), AlN (5%) | 3.11 | 68 | 57 |
| 10 | MgO (3%) | 3.15 | 74 | 56 |
| 11 | $Y_2O_3$ (3%), $Al_2O_3$ (1%) | 3.11 | 79 | 55 |
| 12 | MgO (0.8%), $Al_2O_3$ (2.2%) | 3.09 | 67 | 52 |

EXAMPLES 13 AND 14 AND COMPARATIVE EXAMPLES 5 AND 6

In a dissolving tank maintained at 10° C. by circulating cold water, 100 g of silicon tetrachloride and 9.4 g of $TiCl_4$ (in Example 13) or 0.08 g of $AlCl_3$ and 1.59 g of $YCl_3$ dissolved in carbon tetrachloride (in Example 14) as the sintering aid component providing a sintering aid having a composition shown in Table 4 in the resulting silicon nitride powder were mixed together and sufficiently stirred. Then, an ammonia gas was passed at a rate of 20 g/hr for 4 hours to obtain a powdery mixture of $Si(NH)_2$ and $NH_4Cl$. In Example 14, carbon tetrachloride was removed by drying in vacuo and 0.15 g of water vapor was added to convert the sintering aid component to an oxide. The powdery mixture was charged in a tubular furnace having a diameter of 140 mm, and the temperature was elevated at a rate of 200° C./hr in an ammonia atmosphere and the powdery mixture was maintained at 1,000° C. for 2 hours to obtain a white amorphous powder. From the results of the chemical analysis, it was confirmed that the composition of the formed powder was very close to $Si_2N_3H$.

The powder was press-molded under a molding pressure of 100 $kg/cm^2$ in a molding press having a diameter of 25 mm and heated at 1,550° C. in a nitrogen atmosphere for 0.5 hours. Thus, two kinds of powders were obtained. Each powder was pulverized by a ball mill made of polyethylene and was press-molded into a size of 5 mm×50 mm×4 mm by a molding press. In Example 13, the green compact was hot-pressed at 1,750° C. under a pressure of 400 $kg/cm^2$. In Example 14, the green compact was sintered at 1,650° to 1,750° C. in a nitrogen atmosphere for 4 hours. The surface of each of the resulting sintered materials was ground by a diamond wheel 400, and the density and flexural strength were measured. The obtained results are shown in Table 4.

For comparison, a powdery mixture of $Si(NH)_2$ and $NH_4Cl$ was prepared in the same manner as described above by using silicon tetrachloride not containing the sintering aid component, and the powdery mixture was mixed with a sintering aid shown in Table 4 and the mixture was sintered in the same manner as described above. The measured values of the sintered products are shown in Table 4.

Incidentally, the flexural strength was determined by the three-point bending test where the span length was adjusted to 30 mm, and with respect to each sintered material, 10 specimens were tested and the average value was calculated.

TABLE 4

| | Sintering Aid (% by weight) | Density ($g/cm^3$) | Flexural Strength ($kg/mm^2$) Room temperature | Flexural Strength ($kg/mm^2$) High temperature (1,200° C.) |
|---|---|---|---|---|
| Example 13 | TiN (10%) | 3.12 | 76 | 67 |
| Example 14 | $Y_2O_3$ (3%), $Al_2O_3$ (1%) | 3.15 | 85 | 63 |
| Comparative Example 5 | TiN (10%) | 2.80 | 52 | 47 |
| Comparative Example 6 | $Y_2O_3$ (3%), $Al_2O_3$ (1%) | 3.13 | 79 | 55 |

EXAMPLES 15 and 16

Powdery mixtures of sintering aid component-containing $Si(NH)_2$ and $NH_4Cl$ prepared in the same manner as in Examples 13 and 14 were washed with liquid ammonia maintained at −70° C. to remove $NH_4Cl$ formed as a by-product and isolate $Si(NH)_2$. The powders were maintained at 1,300° C. in a hydrogen atmosphere for 1 hour to obtain two powders. The powders were sintered in the same manner as described in Examples 13 and 14, respectively, and the density and flexural strength were measured. The obtained results are shown in Table 5.

TABLE 5

| Example No. | Sintering Aid (% by weight) | Density ($g/cm^3$) | Flexural Strength ($kg/mm^2$) Room temperature | Flexural Strength ($kg/mm^2$) High temperature (1,200° C.) |
|---|---|---|---|---|
| 15 | TiN (10%) | 3.13 | 74 | 66 |
| 16 | $Y_2O_3$ (3%), $Al_2O_3$ (1%) | 3.15 | 87 | 64 |

We claim:

1. A process for the preparation of a silicon nitride powder having an enhanced sintering activity, which comprises heating D in a non-oxidizing atmosphere a mixture of an amorphous nitrogen-containing silane compound having a specific surface area of 100 to 1,000 $m^2/g$ and from 3 to 17% by weight, based on the weight of the mixture, of a sintering aid selected from the group consisting of $Y_2O_3$, $Al_2O_3$,$MgO$, $Y_2(CO)_3$, $Al_2(CO_3)_3$, $MgCO_3$, Y oxalate, Al oxalate, Mg oxalate and AlN, wherein heating is at a temperature of 1,400° to 1,700° C. in an atmosphere composed mainly of nitrogen or at a temperature of 1,200° to 1,350° C. in vacuum or in an atmosphere composed mainly of at least one gas selected from the groups consisting of hydrogen and argon.

2. A process according to claim 1, wherein the nitrogen-containing silane compound is at least one amorphous compound selected from the group consisting of silicon diimide and $Si_2N_3H$.

3. A process according to claim 1, wherein the amount of the sintering aid is in the range of from 3 to 5% by weight based on the weight of the mixture.

4. A process according to claim 1, wherein the heating is carried out at a temperature of 1,400° to 1,700° C. in an atmosphere composed mainly of nitrogen.

5. A process according to claim 1, wherein the heating is carried out at a temperature of 1,200° to 1,350° C. in vacuum or in an atmosphere composed mainly of at least one gas selected from the group consisting of hydrogen and argon.

* * * * *

UNITED STATES PATENT AND TRADEMARK OFFICE

CERTIFICATE OF CORRECTION

PATENT NO. : 4,612,297

DATED : September 16, 1986

INVENTOR(S) : KASAI et al

It is certified that error appears in the above-identified patent and that said Letters Patent is hereby corrected as shown below:

On The Title Page:

The name of the Assignee now reads "Toya"

The name of the Assignee should read --Toyo--.

Signed and Sealed this

Thirteenth Day of October, 1987

*Attest:*

DONALD J. QUIGG

*Attesting Officer*

*Commissioner of Patents and Trademarks*